United States Patent
Burckhardt et al.

(10) Patent No.: US 9,822,279 B2
(45) Date of Patent: *Nov. 21, 2017

(54) TWO-COMPONENT COMPOSITIONS BASED ON SILANE-FUNCTIONAL POLYMERS

(75) Inventors: Urs Burckhardt, Zurich (CH); Fabien Choffat, Ruttenen (CH); Daniele Rutz, Zurich (CH); Steffen Kelch, Oberengstringen (CH); Ulrich Wolf, Laax (CH)

(73) Assignee: SIKA TECHNOLOGY AG, Baar (CH)

( * ) Notice: Subject to any disclaimer, the term of this patent is extended or adjusted under 35 U.S.C. 154(b) by 240 days.

This patent is subject to a terminal disclaimer.

(21) Appl. No.: 14/235,582

(22) PCT Filed: Aug. 24, 2012

(86) PCT No.: PCT/EP2012/066551
§ 371 (c)(1),
(2), (4) Date: Jan. 28, 2014

(87) PCT Pub. No.: WO2013/030135
PCT Pub. Date: Mar. 7, 2013

(65) Prior Publication Data
US 2014/0179830 A1 Jun. 26, 2014

(30) Foreign Application Priority Data

Aug. 26, 2011 (EP) .................................... 11179077

(51) Int. Cl.
| | | |
|---|---|---|
| C08L 101/10 | (2006.01) | |
| C09D 201/10 | (2006.01) | |
| C08L 63/00 | (2006.01) | |
| C09J 163/00 | (2006.01) | |
| C09D 7/12 | (2006.01) | |
| C09K 3/10 | (2006.01) | |
| C09D 175/12 | (2006.01) | |
| C08G 18/28 | (2006.01) | |
| C08G 18/71 | (2006.01) | |
| C08G 18/83 | (2006.01) | |
| C09J 201/10 | (2006.01) | |
| C08L 101/00 | (2006.01) | |
| C09J 175/12 | (2006.01) | |
| C08L 71/02 | (2006.01) | |

(52) U.S. Cl.
CPC ......... *C09D 175/12* (2013.01); *C08G 18/289* (2013.01); *C08G 18/718* (2013.01); *C08G 18/837* (2013.01); *C08L 101/00* (2013.01); *C08L 101/10* (2013.01); *C09J 175/12* (2013.01); *C09J 201/10* (2013.01); *C08L 63/00* (2013.01); *C08L 71/02* (2013.01)

(58) Field of Classification Search
CPC .. C08G 18/289; C08G 18/718; C08G 18/837; C08L 63/00–63/10; C08L 101/10; C09D 163/00–163/10; C09D 201/10; C09J 163/00–163/10; C09J 201/10
See application file for complete search history.

(56) References Cited

U.S. PATENT DOCUMENTS

| | | | |
|---|---|---|---|
| 3,971,751 A | | 7/1976 | Isayama et al. |
| 4,334,036 A | * | 6/1982 | Yonezawa ................. C08F 8/42 |
| | | | 525/100 |
| 4,562,237 A | | 12/1985 | Okuno et al. |
| 4,657,986 A | | 4/1987 | Isayama et al. |
| 6,107,437 A | * | 8/2000 | Cawse ................. C07D 231/12 |
| | | | 528/94 |
| 6,207,766 B1 | | 3/2001 | Doi et al. |
| 2005/0107499 A1 | * | 5/2005 | Georgeau ................ B32B 11/02 |
| | | | 524/59 |
| 2009/0075086 A1 | * | 3/2009 | Jucker .................... C08G 18/10 |
| | | | 428/411.1 |
| 2010/0279121 A1 | | 11/2010 | Burckhardt et al. |
| 2011/0027591 A1 | * | 2/2011 | Braun .................... C08G 59/50 |
| | | | 428/414 |
| 2014/0179830 A1 | | 6/2014 | Burckhardt et al. |

FOREIGN PATENT DOCUMENTS

| | | | | |
|---|---|---|---|---|
| EP | 0 186 191 | | 7/1986 | |
| EP | 0 371 370 | | 6/1990 | |
| JP | S61-268720 A | | 11/1986 | |
| JP | 08269300 A | * | 10/1996 | |
| JP | H09-279047 A | | 10/1997 | |
| JP | 2001-131465 A | | 5/2001 | |
| JP | 2001-261784 A | | 9/2001 | |
| JP | 2001261784 A | * | 9/2001 | |
| JP | EP 1607460 A2 | * | 12/2005 | ............. C08G 18/10 |
| JP | 2007-284518 A | | 11/2007 | |
| JP | 2014-529650 A | | 11/2014 | |
| WO | WO 02/48228 A2 | | 6/2002 | |

OTHER PUBLICATIONS

Machine translation of JP H08-269300.*
Walter et al., Organic Chemistry: A Comprehensive Degree Text and Source Book, p. 543 (1997).*
Peter A. Ciullo, Industrial Minerals & Their Uses: Handbook and Formulary, p. 125 (1996).*
Hexion Inc., Epon 828 Technical Data Sheet (2005).*
Translation of Mar. 4, 2014 International Preliminary Report on Patentability issued in International Patent Application No. PCT/EP2012/066551.
Oct. 2, 2012 International Search Report issued in International Application No. PCT/EP2012/066551.
Jun. 30, 2015 Office Action issued in Chinese Patent Application No. 201280035425.5.
Apr. 5, 2016 Office Action issued in U.S. Appl. No. 14/232,702.
Aug. 30, 2016 Office Action issued in Japanese Patent Application No. 2014-526518.

(Continued)

Primary Examiner — Kregg Brooks
(74) Attorney, Agent, or Firm — Oliff PLC

(57) ABSTRACT

The invention relates to a two-component composition, including a component A, which includes at least one silane-functional polymer and at least one hardener or accelerator for epoxy resins, and a component B, which includes at least one aqueous emulsion of at least one epoxy resin. Two-component compositions according to the invention are suitable as adhesives, sealants or coatings.

21 Claims, No Drawings

(56) References Cited

OTHER PUBLICATIONS

Sep. 13, 2016 Office Action issued in Chinese Patent Application No. 201280035432.5.
May 31, 2016 Notice of Reasons for Rejection issued in Japanese Patent Application No. 2014-526516.
Apr. 18, 2017 Office Action issued in Japanese Patent Application No. 2014-526518.
Jan. 17, 2017 Office Action issued in Japanese Patent Application No. 2014-526516.
Apr. 17, 2017 Office Action issued in U.S. Appl. No. 14/232,702.

* cited by examiner

TWO-COMPONENT COMPOSITIONS BASED ON SILANE-FUNCTIONAL POLYMERS

AREA OF TECHNOLOGY

The invention relates to two-component compositions based on silane-functional polymers, suitable for use as adhesives, sealants or coatings.

PRIOR ART

Hardenable masses based on silane-functional polymers are known. They are characterized by hardening without bubbles and high adhesive strength. Most of the known compositions of this type are formulated as single-component compositions which harden with the aid of atmospheric moisture. This has the disadvantage that the time required for complete hardening, i.e., reaching the final strength, is relatively long, since the moisture must enter the composition by diffusion, which takes place only very slowly in the case of thick-layer implementations and during the application of the composition, but especially during the bonding of substrates that are impermeable to moisture.

It is known that the hardening of single-component n compositions based on silane-functional polymers can be accelerated by mixing in, during application, a component that contains water in free or bound form. For example, one such system is described in EP0371370. Such accelerated single-component systems do harden rapidly, but because of the asymmetric mixing ratio they are sensitive with regard to the mixing quality and the quantity of water added. In addition, like the single-component systems without accelerator, they are limited in terms of the attainable mechanical properties, such as strength and viscoelasticity, and have a tendency toward brittleness in certain instances.

Compositions based on silane-functional polymers with better mechanical properties, especially higher strength and viscoelasticity, can be obtained, for example, if the silane-functional polymer is combined with an epoxy resin as a hybrid system, for example as described in EP0186191. This involves two-component systems in which, typically, the silane-functional polymer is present in the first component and the epoxy resin in the second component. The hardening of the silane-functional polymer takes place as a result of the atmospheric moisture in this case.

Because of the high viscosity of both the silane-functional polymers and the epoxy resins, such hybrid systems frequently have unsatisfactory application properties. This is expressed in the case of adhesives, for example, by long stringing and requires the use of large amounts of rheology aids. Finally, they give off a strong, unpleasant amine odor during application

PRESENTATION OF THE INVENTION

The goal of the present invention therefore is to overcome the problems with the prior art and thus supply a composition based on silane-functional polymers which, independently of the application conditions such as temperature and relative humidity, hardens quickly and without leaving behind a sticky surface, and in the hardened state, has high strength and viscoelasticity, good adhesion to various substrates, and high thermal stability. In addition, the composition, in the non-cross-linked state, should have a long shelf life and good applicability, especially at room temperature.

This problem is solved according to the invention by a two-component composition according to Claim 1.

Surprisingly it has been found that the combination of a silane-functional polymer in a non-aqueous system with an aqueous emulsion of at least one epoxy resin does not lead to any compatibility problems, which could cause demixing and macroscopic phase separation. Instead the composition according to the invention is characterized by good mechanical properties.

An additional advantage of the composition according to the invention lies in the fact that if necessary it can be produced in such a manner that immediately after application it has good stability and slip resistance, which is desirable in many applications, for example in the application of the composition to vertical surfaces.

Furthermore, the composition according to the invention, in contrast to known hybrid systems based on silane-functional polymers and epoxy resin, gives off little odor during application.

Additional aspects of the invention will be presented in additional independent claims. Particularly preferred embodiments of the invention are the subjects of the dependent claims.

METHODS FOR PERFORMING THE INVENTION

The present invention relates to a two-component composition consisting of a component A comprising
at least one silane-functional polymer P, and
at least one hardener or accelerator for epoxy resins;
and a component B comprising
at least one aqueous emulsion of at least one epoxy resin.

Substance names beginning with "poly," such as polyol or polyisocyanate, in the present document designate substances which contain in their formula two or more of the functional groups occurring in their name per molecule.

The term "polymer" in the present document covers on one hand a group of macromolecules that are chemically uniform but differ with regard to degree of polymerization, molecular weight and chain length and were produced by a polyreaction (polymerization, polyaddition, polycondensation). On the other hand, the term covers derivatives of such a group of macromolecules obtained by polyreaction, thus compounds that were obtained by reactions, such as additions or substitutions, of functional groups on pre-existing macromolecules and which may be chemically uniform or non-uniform. The term furthermore covers so-called pre-polymers, in other words, reactive oligomeric pre-adducts, the functional groups of which participate in the make-up of macromolecules.

The term "polyurethane polymer" covers all polymers produced by the so-called diisocyanate polyaddition method. This also includes polymers that include few or no urethane groups. Examples of polyurethane polymers are polyether-polyurethanes, polyester-polyurethanes, polyether-polyureas, polyureas, polyester-polyureas, polyisocyanurates and polycarbodiimides.

In the present document, the terms "silane" and "organosilane" respectively indicate compounds that on one hand contain at least one, generally two or three, alkoxy groups or acyloxy groups attached via Si—O bonds directly to the silicon atom, and on the other hand at least one organic radical attached via a Si—C bond directly to the silicon atom. Such silanes are also known to the person skilled in the art as organoalkoxysilanes or organoacyloxysilanes.

Correspondingly, the term "silane group" designates the silicon-containing group attached to the organic moiety of the silane via the Si—C bond. The silanes, or their silane groups, have the characteristic of hydrolyzing upon contact with moisture. In this process, organosilanols are formed, i.e., organosilicon compounds containing one or more silanol groups (SiOH groups), and, through subsequent condensation reactions, organosiloxanes, i.e., organosilicon compounds containing one or more siloxane groups (Si—O—Si-groups).

The term "silane-functional" designates compounds containing silane groups. "Silane-functional polymers" are thus polymers that contain at least one silane group.

"Aminosilanes" and "mercaptosilanes" are the respective terms used for organosilanes in which the organic radical contains an amino group of a mercapto group. "Primary aminosilanes" is the term used for aminosilanes that contain a primary amino group, thus an $NH_2$ group bound to an organic radical. "secondary aminosilanes: are aminosilanes that contain a secondary amino group, thus an NH group that is bound to two organic radicals.

The term "molecular weight' is defined in the present document as the average molecular weight $M_n$ (number-average).

In the present document, "room temperature" designates a temperature of 23° C.

Component A of the composition according to the invention contains at least one silane-functional polymer P, which especially contains end groups of formula (I).

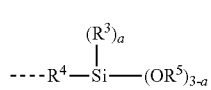

(I)

Here the radical $R^3$ represents a linear or branched, monovalent carbohydrate radical with 1 to 8 C atoms, especially a methyl or ethyl group.

The radical $R^4$ represents a linear or branched, divalent hydrocarbon radical with 1 to 12 C atoms, which optionally contains cyclic and/or aromatic fractions, and optionally one or more hetero atoms, especially one or more nitrogen atoms. In particular, $R^4$ represents a linear or branched alkylene group with 1 to 6 C atoms, preferably methylene or 1,3-propylene, particularly preferably 1,3-propylene.

The radical $R^5$ represents an acyl radical or a linear or branched, monovalent hydrocarbon radical with 1 to 5 C atoms, especially a methyl, ethyl or isopropyl group.

The subscript a represents a value of 0 or 1 or 2, especially a value of 0.

Within a silane group of formula (I), $R^3$ and $R^5$ each independently represent the radicals described. For example, compounds with end groups of formula (I) which are ethoxy-dimethoxysilane end groups ($R^5$=methyl, $R^5$=methyl, $R^5$=ethyl) are possible.

In a first embodiment, the silane-functional polymer P is a silane-functional polyurethane polymer P1, obtainable by reacting a silane having at least one group reactive with isocyanate groups, with a polyurethane polymer having isocyanate group. This reaction is preferably performed at a stoichiometric ratio of the groups reactive toward isocyanate groups to isocyanate groups of 1:1 or with a slight excess of groups reactive toward isocyanate groups, so that the resulting silane-functional polyurethane polymer P1 is completely free from isocyanate groups.

In the reaction of the silane which has at least one group reactive toward isocyanate groups with a polyurethane polymer that contains isocyanate groups, the silane can theoretically, although not preferentially, be used in substoichiometric quantities, so that a silane-functional polymer containing both silane groups and isocyanate groups is obtained.

The silane containing at least one group reactive toward isocyanate groups is particularly a mercaptosilane or an aminosilane, preferably an aminosilane.

The aminosilane is preferably an aminosilane AS of formula (II),

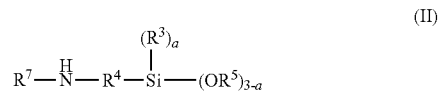

(II)

wherein $R^3$, $R^4$, $R^5$ and a were already described in the preceding and $R^7$ represents a hydrogen atom or a linear or branched, monovalent hydrocarbon radical with 1 to 20 C atoms, optionally containing cyclic moieties, or a radical of formula (III).

(III)

Here, the radicals $R^8$ and $R^9$ each independently represent a hydrogen atom or a radical from the group consisting of —$R^{11}$, —$COOR^{11}$ and —CN.

The radical $R^{10}$ represents a hydrogen atom or a radical from the group consisting of —$CH_2$—$COOR^{11}$, —$COOR^{11}$, —$CONHR^{11}$, —$CON(R^{11})_2$, —CN, —$NO_2$, —$PO(OR^{11})_2$, —$SO_2R^{11}$ and —$SO_2OR^{11}$.

The radical $R^{11}$ represents a hydrocarbon radical with 1 to 20 C atoms, optionally containing at least one hetero atom.

Examples of suitable aminosilanes AS are primary aminosilanes such as 3-aminopropyltrimethoxysilane, 3-aminopropyldimethoxymethylsilane; secondary aminosilanes such as N-butyl-3-aminopropyltrimethoxysilane, N-phenyl-3-aminopropyl-trimethoxysilane; the products from the Michael-like addition of primary aminosilanes such as 3-aminopropyltrimethoxysilane or 3-aminopropyldimethoxymethylsilane to Michael acceptors such as acrylonitrile, (meth)acrylic acid esters, (meth)acrylic acid amides, maleic acid and fumaric acid diesters, citraconic acid diesters and itaconic acid diesters, for example N-(3-trimethoxysilyl-propyl)-amino-succinic acid dimethyl- and -diethyl esters; and analogs of the aminosilanes mentioned with ethoxy or isopropoxy groups in place of the methoxy groups on the silicon. Particularly suitable aminosilanes AS are secondary aminosilanes, especially aminosilanes AS, in which $R^7$ in formula (II) is different from H. The Michael-like adducts are preferred, especially N-(3-trimethoxysilyl-propyl)-amino-succinic acid diethyl ester.

The term "Michael acceptor" in the present document designates compounds which, as a result of the electron-accepting radical activated double bonds that they contain, can undergo nucleophilic addition reactions with primary amino groups in a manner analogous to Michael addition (Hetero-Michael-Addition).

Suitable isocyanate group-containing polyurethane polymers for producing a silane-functional polyurethane polymer P1 are, for example, polymers that can be obtained by reacting at least one polyol with at least one polyisocyanate, especially a diisocyanate. This reaction can be performed by reacting the polyol and the polyisocyanate using the usual methods, for example at temperatures of 50° C. to 100° C., optionally also using suitable catalysts, wherein the polyisocyanate is added in such a way that the isocyanate groups thereof are present in a stoichiometric excess relative to the hydroxyl groups of the polyol.

In particular, the excess of polyisocyanate is selected such that after all of the hydroxyl groups of the polyol have reacted, a free isocyanate group content of 0.1 to 5% by weight, preferably 0.1 to 2.5% by weight, particularly preferably 0.2 to 1% by weight, based on the total polymer, will remain in the resulting polyurethane polymer.

If desired, the polyurethane polymer can be produced with the aid of plasticizers, wherein the plasticizers used do not contain any groups reactive toward isocyanates.

Preferred polyurethane polymers are those with the free isocyanate group mentioned, obtained from the reaction of diisocyanates with high-molecular-weight diols in an NCO:OH ratio of 1.5:1 to 2.2:1.

Especially suitable polyols for producing the polyurethane polymers are polyether polyols, polyester polyols and polycarbonate polyols and mixtures of these polyols.

Especially suitable polyether polyols, also called polyoxyalkylene polyols or oligoetherols are those that are polymerization products of ethylene oxide, 1,2-propylene oxide, 1,2- or 2,3-butylene oxide, oxetane, tetrahydrofuran or mixtures thereof, optionally polymerized with the aid of a starter molecule with two or more active hydrogen atoms, for example water, ammonia or compounds with several OH or NH groups, such as 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and mixtures of the compounds mentioned. Both polyoxyalkylene polyols, which have a low degree of unsaturation (measured according to ASTM D-2849-69 and stated in milliequivalents of unsaturation per g polyol (mEq/g)), produced for example with the aid of so-called Double Metal Cyanide complex catalysts (DMC-catalysts), and polyoxyalkylene polyols with a higher degree of unsaturation, produced for example with the aid of anionic catalysts such as NaOH, KOH, CsOH or alkali alcoholates may be used.

Particularly suitable are polyoxyethylene polyols and polyoxypropylene polyols, especially polyoxyethylene diols, polyoxypropylene diols, polyoxyethylene triols and polyoxypropylene triols.

Especially suitable are polyoxyalkylene diols or polyoxyalkylene triols with a degree of unsaturation of less than 0.02 mEq/g and with a molecular weight in the range of 1000 to 30,000 g/mol, as well as polyoxyethylene diols, polyoxyethylene triols, polyoxypropylene diols and polyoxypropylene triols with a molecular weight of 400 to 20,000 g/mol.

Also particularly suitable are so-called ethylene oxide-endcapped ("EO-endcapped") polyoxypropylene polyols. The latter are special polyoxypropylene-polyoxyethylene polyols, obtained for example in that pure polyoxypropylene polyols, especially polyoxypropylene diols and -triols, are further alkoxylated with ethylene oxide after completion of the polypropoxylation reaction and thus contain primary hydroxyl groups. In this case, polyoxypropylene-polyoxyethylene diols and polyoxypropylene-polyoxyethylene triols are preferred.

Also suitable are hydroxyl group-endcapped polybutadiene polyol, for example those produced by polymerization of 1,3-butadiene and allyl alcohol or by oxidation of polybutadiene and the hydrogenation products thereof.

Also suitable are styrene-acrylonitrile grafted polyether polyols, for example those commercially available under the trade name of Lupranol® from the firm of Elastogran GmbH, Germany.

Especially suitable polyester polyols are polyesters containing at least two hydroxyl groups and produced by known methods, especially polycondensation of hydroxycarboxylic acids or polycondensation of aliphatic and/or aromatic polycarboxylic acids with dihydric or polyhydric alcohols.

Especially suitable are polyester polyols produced from dihydric to trihydric alcohols, such as 1,2-ethanediol, diethylene glycol, 1,2-propanediol, dipropylene glycol, 1,4-butanediol, 1,5-pentanediol, 1,6-hexanediol, neopentylglycol, glycerol, 1,1,1-trimethylolpropane or mixtures of the aforementioned alcohols with organic dicarboxylic acids or anhydrides or esters thereof, for example succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic acid anhydride, isophthalic acid, terephthalic acid, dimethyl terephthalate, hexahydrophthalic acid, trimellitic acid and trimellitic acid anhydride or mixtures of the above-named acids, as well as polyester polyols from lactones, for example ε-caprolactone.

Particularly suitable are polyester diols, especially those produced from adipic acid, azelaic acid, sebacic acid, dodecane dicarboxylic acid, dimer fatty acid, phthalic acid, isophthalic acid and terephthalic acid as dicarboxylic acids or from lactones such as ε-caprolactone and from ethylene glycol, diethylene glycol, neopentyl glycol, 1,4-butanediol, 1,6-hexanediol, dimer fatty acid diol and 1,4-cyclohexanedimethanol as divalent alcohol.

Especially suitable polycarbonate polyols are those obtained by reacting, for example, the above-mentioned alcohols used for making up the polyester polyols, alcohols with dialkyl carbonates such as dimethyl carbonate, diary carbonates such as diphenyl carbonate or phosgene. Particularly suitable are polycarbonate diols, especially amorphous polycarbonate diols.

Additional suitable polyols are poly(meth)acrylate polyols.

Further suitable are polyhydroxy-functional fats and oils, for example natural fats and oils, especially castor oil, or polyols obtained by chemical modification of natural fats and oils, so-called oleochemical polyols, which are obtained for example by epoxidation of unsaturated oils and subsequent ring opening with carbonic acids or alcohols, epoxypolyesters or epoxy-polyethers, or polyols obtained by hydroformylation and hydrogenation of unsaturated oils. Also suitable are polyols obtained from natural fats and oils by degradation processes such as alcoholysis or ozonolysis and subsequent chemical linkage, for example by ester exchange or dimerization, of the degradation products or derivatives obtained in this way. Suitable degradation products of natural fats and oils are especially fatty acids and fatty alcohols as well as fatty acid esters, especially the methyl esters (FAME), which can be derivatized for example by hydroformylation and hydrogenation to hydroxy-fatty acid esters.

Also suitable are polyhydrocarbon polyols, also known as oligohydrocarbonols, for example polyhydroxyfunctional ethylene-propylene, ethylene-butylene or ethylene-propylene-diene copolymers, such as those manufactured by the firm of Kraton Polymers, USA, or polyhydroxyfunctional copolymers from dienes such as 1,3-butanedienes or diene mixtures and vinyl monomers such as styrene, acrylonitrile or isobutylene, or polyhydroxyfunctional polybutadiene polyols, for example those that can be obtained by copolymerization of 1,3-butadiene and allyl alcohol and may also be hydrogenated.

Also suitable are polyhydroxyfunctional acrylonitrile/butadiene copolymers, which can be produced for example from epoxides or amino alcohols and carboxyl-endcapped acrylonitrile/butadiene copolymers, and which are commercially available under the name of Hypro® CTBN from the firm of Emerald Performance Materials, LLC, USA.

These polyols mentioned preferably have a mean molecular weight of 250 to 30,000 g/mol, especially of 1000 to 30,000 g/mol, and a mean OH functionality in the range of 1.6 to 3.

Particularly suitable polyols are polyester polyols and polyether polyols, especially polyoxyethylene polyol, polyoxypropylene polyol and polyoxypropylene-polyoxyethylene polyol, preferably polyoxyethylene diol, polyoxypropylene diol, polyoxyethylene triol, polyoxypropylene triol, polyoxypropylene-polyoxyethylene diol and polyoxypropylene-polyoxyethylene triol.

In addition to these named polyols, small amounts of low-molecular-weight divalent or polyvalent alcohols such as 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimer fatty alcohols, 1,1,1-trimethylolethane, 1,1,1-trimethylolpropane, glycerol, pentaerythritol, sugar alcohols such as xylitol, sorbitol or mannitol, sugars such as sucrose, other higher-valent alcohols, low molecular weight alkoxylation products of the aforementioned divalent and polyvalent alcohols, and mixtures of the aforementioned alcohols may also be used in the manufacturing of the isocyanate-endcapped polyurethane polymers.

For adjusting the OH functionality of the polyols, monovalent alcohols (mono-ols) may additionally be used, for example butanol, 2-ethylhexanol or an alcohol-initiated polyoxyalkylene mono-ol.

Examples of the polyisocyanates used for producing the polyurethane polymers may include commercial polyisocyanates, especially diisocyanates.

For example, suitable diisocyanates are 1,6-Hexamethylene diisocyanate (HDI), 2-methyl-pentamethylene-1,5-diisocyanate, 2,2,4- and 2,4,4-trimethyl-1,6-hexamethylene diisocyanate (TMDI), 1,12-Dodecamethylene diisocyanate, lysine and lysine ester diisocyanate, cyclohexane-1,3-diisocyanate, cyclohexane-1,4-diisocyanate, 1-Isocyanato-3,3,5-trimethyl-5-isocyanatomethyl-cyclohexane (isophorone diisocyanate or IPDI), perhydro-2,4'-diphenylmethane diisocyanate and perhydro-4,4'-diphenylmethane diisocyanate, 1,4-diisocyanato-2,2,6-trimethylcyclohexane (TMCDI), 1,3- and 1,4-bis-(isocyanatomethyl)-cyclohexane, m- and p-xylylene diisocyanate (m- and p-XDI), m- and p-tetramethyl-1,3-xylylene diisocyanate, m- and p-tetramethyl-1,4-xylylene diisocyanate, bis-(1-isocyanato-1-methyl-ethyl)-naphthalene, 2,4- and 2,6-toluylene diisocyanate (TDI), 4,4'-, 2,4'- and 2,2'-diphenylmethane diisocyanate (MDI), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatodiphenyl (TODI), oligomers and polymers of the aforementioned polyisocyanate, and arbitrary mixtures of the aforementioned polyisocyanates.

Particularly suitable polyisocyanates are HDI, TMDI, IPDI, TDI and MDI, especially IPDI.

For example, suitable silane-functional polymers P1 are commercially under the trade names of Polymer ST, for example Polymer ST50, from the firm of Hanse Chemie AG, Germany, and under the trade name of Desmoseal® from the firm of Bayer MaterialScience AG, Germany.

In a second embodiment the silane-functional polymer P is a silane-functional polyurethane polymer P2, obtainable by reacting an isocyanatosilane IS with a polymer that has end groups reactively functional with respect to isocyanate groups. This reaction takes place at stoichiometric proportions of the isocyanate groups to the reactive functional end groups relative to isocyanate groups of 1:1 or with a slight excess of the reactive functional end groups, for example at temperatures of 20° C. to 100° C., optionally using catalysts.

Suitable as the isocyanatosilane IS are compounds of formula (V).

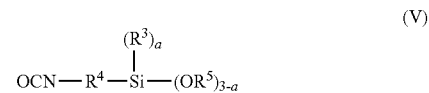

(V)

where $R^3$, $R^5$, $R^4$ and a were already described in the preceding.

Examples of suitable isocyanatosilanes IS of formula (V) are isocyanatomethyl trimethoxysilane, isocyanatomethyl dimethoxy methylsilane[,] 3-Isocyanatopropyltrimethoxysilane[,] 3-Isocyanatopropyldimethoxymethylsilane and analogues thereof with ethoxy or isopropoxy groups in place of the methoxy groups on the silicon.

The polymer preferably contains hydroxyl groups as reactive functional end groups toward isocyanate groups.

Suitable hydroxyl group-containing polymers are on one hand the previously mentioned polyols, especially high-molecular-weight polyoxyalkylene polyols, preferably polyoxypropylene diols with a degree of unsaturation of less than 0.02 mEq/g and with a molecular weight in the range of 2000 to 30,000 g/mol, especially those with a molecular weight in the range of 4000 to 30,000 g/mol.

On the other hand, hydroxyl group-containing, especially hydroxyl group-endcapped, polyurethane polymers are also suitable for reacting with isocyanatosilanes IS of formula (V). Such polyurethane polymers are obtainable by reacting at least one polyisocyanate with at least one polyol. This reaction can be performed in that the polyol and the polyisocyanate are made to react by customary methods, for example at temperatures of 50° C. to 100° C., optionally using suitable catalysts, wherein the polyol is added in such a manner that its hydroxyl groups are present in stoichiometric excess in relation to the isocyanate groups of the polyisocyanate. A ratio of hydroxyl groups to isocyanate groups of 1.3:1 to 4:1, especially of 1.8:1 to 3:1 is preferred.

Optionally, the polyurethane polymer can be manufactured using plasticizers, wherein the plasticizers used do not contain any groups reactive toward isocyanates.

The same polyols and polyisocyanates are suitable for this reaction as were already mentioned as suitable for producing an isocyanate group-containing polyurethane polymer that is used for producing a silane-functional polyurethane polymer P1.

Examples of suitable silane-functional polymers P2 are those that are commercially available under the trade names of SPUR+® 1010LM, 1015LM and 1050MM from the firm of Momentive Performance Materials Inc., USA, and under the trade names of Geniosil® STP-E15, STP-10 and STP-E35 from the firm of Firma Wacker Chemie AG, Germany.

In a third embodiment, the silane-functional polymer P is a silane-functional polymer P3 which is obtainable by a hydrosilylation reaction of polymers with terminal double bonds, for example poly(meth)acrylate polymers or polyether polymers, especially of allyl-endcapped polyoxyalkylene polymers, described for example in U.S. Pat. No. 3,971,751 and U.S. Pat. No. 6,207,766, the total disclosure of which is herewith incorporated.

For example, suitable silane-functional polymers P3 are commercially available under the trade names MS Polymer™ S203H, S303H, S227, S810, MA903 and S943, Silyl™ SAX220, SAX350, SAX400 and SAX725, Silyl™ SAT350 and SAT400, as well as XMAP™ SA100S and SA310S from the firm of Kaneka Corp., Japan, and under the trade names Excestar® S2410, S2420, S3430, S3630, W2450 and MSX931 from the firm of Asahi Glass Co, Ltd., Japan.

Preferred silane-functional polymers P are silane-functional polymers P1 and silane-functional polyurethane polymers P3. Particularly preferred are silane-functional polymers P1.

The silane-functional polymer P is usually present in a quantity of 10 to 80% by weight, especially in a quantity of 15 to 70% by weight, preferably 20 to 60% by weight, based on the total composition.

Component A of the composition according to the invention also contains, in addition to the silane-functional polymer, at least one hardener or accelerator for epoxy resins. These are especially polyamines, for example isophorone diamine, m-xylylenediamine, polyether amines such as those that are commercially available under the trade names Jeffamine® from Huntsman International LLC, USA, polyethylenimines, polyamidoamines, polyalkyleneamines such as diethylenetriamine (DE-TA), triethylenetetramine (TETA), tetraethylenepentamine (TEPA) or pentaethylenhexamine (PEHA), amine-epoxy adducts, pentamethyl diethylenetriamine, N,N-dimethyl-N'-(dimethylaminopropyl)-1,3-propanediamine, bis(2-dimethylaminoethyl)ether, bis-(dimethylaminoethyl)-piperazine, N,N'-dimethylpiperazine; Mannich bases, for example dimethylaminomethylphenol, 2,4,6-tris(dimethylaminomethyl)phenol and 2,4,6-tris((3-(dimethylamino)propyl)-aminomethyl)phenol; polymercaptans, for example liquid mercaptan-terminate poly-sulfide polymers, such as those commercially available under the trade name of Thiokol® from SPI Supplies, USA, or Toray Fine Chemicals, Japan, and Thioplast® from Akzo Nobel NV, The Netherlands, mercaptan-endcapped polyoxyalkylene derivatives, such as those known under the trade names Capharden® from Cognis GmbH, Germany, polyesters of thiocarboxylic acids such as pentaerythritol tetramercaptoacetate, trimethylolpropane trimercaptoacetate and glycol dimercaptoacetate, and aromatic polymercaptans such as 2,4,6-trimercapto-1,3,5-triazine; or imidazoles, for example imidazole, 1-methylimidazole, 1-ethylimidazole, 1-vinylimidazole, 2-methylimidazole, 2-ethylimidazole, 2-isopropylimidazold, 2-heptadecylimidazole, 2-phenylimidazole, 2-ethyl-4-methylimidazole, 1-benzyl-2-methylimidazole and 2,4-diamino-6-(2'-methylimidazolyl-(1'))-ethyl-s-triazine; and mixtures of the aforementioned hardeners or accelerators for epoxy resins.

In addition to the hardeners or accelerators mentioned, additional accelerators, especially phosphites, [or] acids, especially phosphoric acid and carboxylic acids, may be used.

Preferred hardeners or accelerators for epoxy resins are tertiary polyamines, especially pentamethyl-diethylene triamine, N,N-dimethyl-N'-(dimethylaminopropyl)-1,3-propanediamine,bis(2-dimethylaminoethyl)ether, bis-(dimethylaminoethyl)-piperazine, N,N'-dimethylpiperazine; Mannich bases, especially dimethylaminomethylphenol, 2,4,6-tris(dimethylaminomethyl)phenol and 2,4,6-tris((3-(dimethylamino)propyl)aminomethyl)phenol; as well as imidazoles, especially 1-methylimidazole, 1-ethylimidazole, 1-vinylimidazole, 2-methylimidazole, 2-ethylimidazole, 2-isopropylimidazole, 2-heptadecylimidazole, 2-ethyl-4-methylimidazole and 1-benzyl-2-methylimidazole. Particularly preferred are the Mannich bases mentioned.

The fraction of the hardener or accelerator for epoxy resins is preferably 0.5 to 15% by weight, especially 1 to 10% by weight, based on component A.

Component B of the composition according to the invention comprises at least one aqueous emulsion of at least one epoxy resin.

The epoxy resin is preferably a liquid resin. Preferred liquid epoxy resins have the formula (VI).

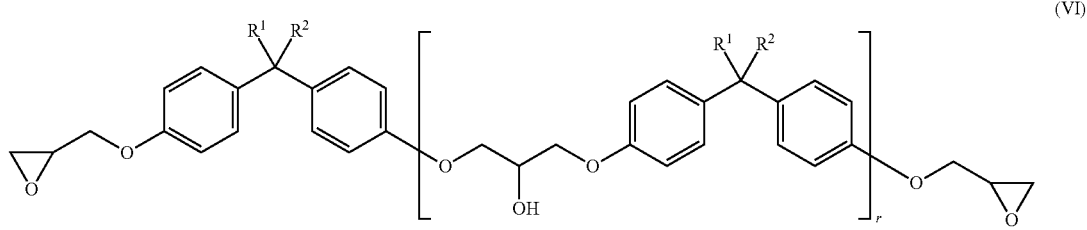

(VI)

Here, the substituents $R^1$ and $R^2$ independently represent either H or $CH_3$. In addition, the subscript r represents a value of 0 to 1. Preferably, r represents a value of ≤0.2.

Thus these are preferably diglycidyl ethers of bisphenol A (DGEBA), bisphenol F and bisphenol A/F. The designation "A/F" here refers to a mixture of acetone with formaldehyde, which is used as an educt in the production of bisphenol A/F. Suitable liquid resins, for example, are commercially available under the trade names Araldite® GY 250, Araldite® GY 282, Araldite® PY 304 from Huntsman International LLC, USA, or D.E.R.® 330 or D.E.R.® 331 from Dow Chemical Company, USA, or under the trade names Epikote® 828 or Epikote® 862 from Hexion Specialty Chemicals Inc., USA.

The epoxy resin is typically present in unmodified form. In particular, it is not modified for better emulsifiability, for example with a fatty acid.

The aqueous emulsion of at least one epoxy resin optionally contains at least one reactive diluent. Suitable reactive diluents include especially monofunctional epoxides, preferably glycidylated fatty alcohols.

Preferably the emulsion also contains at least one external emulsifier, especially a nonionic emulsifier, for example a fatty alcohol ethoxylate.

The emulsion preferably has an emulsifier content of ≤10% by weight, especially ≤5% by weight.

The emulsion advantageously has a solids content of 60 to 90% by weight, especially of 70 to 90% by weight, preferably of 75 to 85%.

Correspondingly, the aqueous emulsion of at least one epoxy resin contains about 10 to 40% by weight, especially 10 to 30% by weight, preferably 15 to 25% by weight, of water.

The mean particle size (droplet diameter) of the emulsion especially falls in the range of 0.05 of 10 μm, especially von 0.1 to 7 μm, particularly preferably of 0.2 to 5 μm. The emulsion preferably has a narrow particle size distribution, wherein the size ratio of the largest to the smallest particle has a value in the range of preferably ≤20. Especially the particle size distribution is such that 90% of the particles in the emulsion are smaller than 6 μm, preferably smaller than 4 μm, particularly preferably smaller than 3 μm.

As a result of the small mean particle size and the narrow particle size distribution, the emulsion has a low tendency toward creaming or hardening and thus has a long storage life.

The preparation of the emulsion preferably takes place in a continuous process, especially using a stator-rotor mixer. Such a method is known to the person skilled in the art. The particular advantages of such a method lie in the fact that the emulsion can be produced without the addition of solvents even if the viscosity of the epoxy resin is relatively high.

It is also advantageous that as a result of the operating mode close to the phase inversion point, high to very high solids contents are possible in the case of small, narrowly distributed particle sizes, yielding emulsions with particularly high shelf life.

Additional advantages of the method described can be seen in the fact that the emulsion is only slightly heated by the method and that is can be manufactured cost-advantageously.

The manufacturing preferably takes place without addition of solvents.

In particular, components A and B contain additional components such as fillers and reinforcing agents, plasticizers or diluents, hardeners and crosslinking agents, accelerators and catalysts, stabilizers, adhesive promoters, rheology promoters, drying agents and the like. When such additional constituents are used it is necessary to make sure that these are compatible with one another and with the respective components, and do not undergo any premature reactions, especially with the silane-functional polymer or with the epoxy resin.

Component A of the composition according to the invention especially contains at least one catalyst for crosslinking the silane-functional polymers by means of moisture. Such catalysts are especially organotin compounds, for example dibutyltin dilaurate, dioctyltin dilaurate, dibutyltin diacetylacetonate and dioctyltin diacetylacetonate; titanates and zirconates, for example tetraisobutoxytitanate and diisobutoxytitanium-bis-(ethyl acetoacetate); nitrogen compounds, especially tertiary amines, for example N,N-dimethylbenzylamine, N,N-dimethylcyclohexylamine and 1,4-diazabicyclo[2.2.2]octane, and amidines and guanidines, for example 1,8-diazabicyclo[5.4.0]undec-7-ene and 1,1,3,3-tetramethylguanidine; and mixtures of the catalysts mentioned.

Component A of the composition according to the invention further contains especially at least one aminosilane, an epoxysilane or a mercaptosilane. Particularly suitable are 3-aminopropyl-dialkoxyalkylsilanes, 3-aminopropyl-trialkoxysilanes, N-(2-aminoethyl)-3-aminopropyl-dialkoxyalkylsilanes, N-(2-aminoethyl)-3-aminopropyl-trialkoxysilanes, 3-glycidoxypropyltrialkoxysilanes and 3-mercaptopropyl-trialkoxysilanes. Preferred are 3-aminopropyl-trimethoxysilane, 3-aminopropyl-triethoxysilane, N-(2-aminoethyl)-3-aminopropyl-dimethoxymethylsilane, N-(2-aminoethyl)-3-aminopropyl-trimethoxysilane, N-(2-aminoethyl)-3-aminopropyl-triethoxysilane, 3-glycidoxypropyltrimethoxysilane, 3-glycidoxypropyltriethoxysilane, 3-mercaptopropyl-trimethoxysilane and 3-mercaptopropyl-triethoxysilane. The use of such an aminosilane in component A of the composition according to the invention can result in improved compatibility of the different phases and covalent binding of the silane-functional polymer with the epoxy resin after mixing the components.

Preferably component A of the composition according to the invention additionally contains at least one filler. The filler influences both the rheologic properties of the not fully hardened composition and the mechanical properties and surface texture of the fully hardened composition. Suitable fillers are inorganic and organic fillers, for example natural, ground or precipitated calcium carbonates, optionally coated with fatty acids, especially stearic acid, barium sulfate, calcined kaolins, aluminum oxide, aluminum hydroxide, silica, especially highly dispersed silica from pyrolysis processes, carbon black, especially industrially manufactured carbon black, PVC powder or hollow beads. Preferred fillers are calcium carbonate, calcined kaolins, carbon black, highly dispersed silica and flame retardant fillers, such as hydroxy-ides or hydrates, especially hydroxides or hydrates of aluminum, preferably aluminum hydroxide.

It is entirely possible and may even be advantageous to use a mixture of different fillers.

A suitable quantity of filler in component A for example falls in the range of 20 to 70% by weight, preferably 30 to 60% by weight, based on the total composition.

Furthermore, component A of the composition according to the invention may contain additional components, for example plasticizers such as esters of organic carboxylic acids or anhydrides thereof, such as phthalates, for example dioctyl phthalate, diisononyl phthalate or diisodecyl phthalate, adipates, for example dioctyl adipate, azelates and sebacates, polyols, for example polyoxyalkylene polyols or polyester polyols, organic phosphoric and sulfonic acid esters or polybutene; solvents; fibers, for example made of polyethylene; dyes; pigments; rheology modifiers such as thickeners or thixotropic agents, for example urea compounds of the type described as "thixotropy endowing agent" in WO 02/48228 A2 on pages 9 to 11, polyamide waxes, bentonites or pyrogenic silicas; adhesion promoters, for example epoxysilanes, (meth)acryl silanes, anhydridosilanes, adducts of the aforementioned silanes with primary aminosilanes, and aminosilanes or urea silanes; crosslinking agents, for example silane-functional oligomers and polymers; drying agents, for example vinyltrimethoxysilane, α-functional silanes such as N-(silylmethyl)-O-methyl-carbamates, especially N-(methyldimethoxysilylmethyl)-O-methyl-carbamate, (methacryloxymethyl)silanes, methoxymethylsilanes, N-phenyl-, N-cyclohexyl- and N-alkylsilanes, orthoformic acid esters, calcium oxide or molecular sieves; stabilizers, for example against heat, light and UV radiation; flame retardant substances; surface-active substances such as wetting agents, leveling agents, deaeration agents or defoamers; biocides such as algicides, fungicides or fungal growth inhibiting substances; as well as additional substances customarily used in moisture-hardening compositions.

As component A of the composition according to the invention, compositions may also be used such as single-component, moisture-hardening compositions based on silane-functional polymers, especially as adhesives, sealants or coatings, and commercially available for example under the trade names Sikaflex® or SikaBond® from Sika Schweiz AG.

Component B also optionally contains, in addition to the aqueous emulsion of at least one epoxy resin, a silane selected from the group consisting of epoxysilanes, especially 3-glycidoxypropyl-dimethoxymethyl silane, 3-glycidoxypropyltrimethoxysilane or 3-glycidoxypropyl-triethoxysilane, (meth)acrylsilane, especially 3-methacryloxypropyl-trimethoxysilane, and anhydridosilane, especially (trimethoxysi-lyl)propyl-succinic acid anhydride or 3-(triethoxysilyl)propyl succinic acid anhydride.

The silane in component B is preferably an epoxysilane or a (meth)acrylsilane.

The use of such a silane in component B of the composition according to the invention can produce improved compatibility of the different phases and covalent bonding of the silane-functional polymers with the epoxy resin after mixing the components.

In addition, component B optionally contains especially a rheology aid or a filler.

Component A of the previously described two-component composition is manufactured and stored in the absence of moisture. In this form, component A is storage-stable, i.e., as long as moisture is excluded it can be stored in a suitable package or arrangement over a period of several months up to a year or longer without undergoing a change in its application properties or its properties after hardening to any extent relevant for use.

Component B is typically also stable when stored under normal atmospheric conditions.

The two components A and B are preferably stored at room temperature in a drum that is impermeable to air, wherein the drum for component A especially consists of plastic (polyolefin) or of metal (aluminum) with an interior coating.

For application of the two-component composition, components A and B are mixed together, for example by stirring, kneading, rolling or the like, but especially using a static mixer or with the aid of a dynamic mixer.

In this process, component A comes into contact with the water in the aqueous emulsion of at least one epoxy resin from component B, which leads to cross-linking of the silane-functional polymers in the composition.

During the application of the two-component composition, component B is preferably used in a proportion relative to component A such that at least 50%, preferably 100%, of all silane groups in the total two-component composition can react with the water present in component B.

In particular, the two-component composition according to the invention is used in such a way that the weight ratio of component A to component B is ≥1:1, especially 1:1 to 100:1, preferably 1.5:1 to 50:1, particularly preferably 2:1 to 20:1.

When the two components A and B are combined, in addition to the cross-linking of the composition by reaction of the silane groups, complete hardening of the epoxy resin from component B takes place. Through the complete hardening of the epoxy resin, the hardened composition develops a distinctly increased strength.

Contact of the two-component composition with water in the form of atmospheric humidity is not urgently necessary for hardening, but can promote it. In particular, the after-hardening of the composition by means of atmospheric humidity can occur.

The complete hardening of the two-component composition especially takes place at room temperature. In certain cases it may be advantageous to harden the partially hardened composition additionally or completely with the aid of elevated temperature, for example in the range of 40 to 100° C.

In particular the hardening of the composition is performed in that on one hand an adequate pot life or open time is guaranteed, and on the other hand within a period of several minutes to several hours, the hardening has progressed to the point where the composition can be further processed or a bond made with the composition is self-supporting and can be transported.

In addition, the present invention comprises the use of a previously described two-component composition as an adhesive, sealant or coating.

The two-component composition according to the invention is especially suitable for adhering, sealing or coating of substrates made of concrete, mortar brick, tile, ceramic, plaster, natural stone such as granite or marble, glass, glass-ceramic, metal or metal alloys such as aluminum, steel, nonferrous metal, galvanized metal, wood, plastic such as PVC, polycarbonates, polymethyl(meth)acrylate, polyesters, epoxy resin, composite materials, paint or lacquer.

The two-component composition is preferably used for elastic to semi-structural adhesion and sealing applications in the construction and finishing industry as well as in vehicle construction, for example for joint sealing, roof sealing, floor bonding, façade element bonding, bonding of mounted parts, seam lining, hermetic sealing of cavities, mounting, trim bonding, windshield bonding, and composite bonding.

The two-component composition is also especially advantageous if isocyanate-free products are to be used for reasons of occupational and health protection.

In addition, the invention relates to a hardened composition such as is obtainable from a previously described two-component composition by mixing component A with component B.

In addition the invention relates to an article that has an at least partially hardened composition according to the preceding description, wherein this article especially involves an article of construction, an industrial article or a means of transport or a part thereof.

An exemplary list of such articles includes houses, glass facades, windows, bathtubs, bathrooms, kitchens, roofs, bridges, tunnels, roads, automobiles, trucks, rail vehicles, buses, ships, mirrors, windshields, tanks, white goods, household apparatus, dishwashers, washing machines, stoves, headlights, fog lights or solar panels such as photovoltaic or solar thermal modules.

EXAMPLES

In the following, illustrative embodiments are presented, which are intended to explain the invention described in greater detail. Naturally, the invention is not limited to these illustrative embodiments described.

Description of Measurement Methods

The viscosity was measured on a thermostatically controlled ball-plate viscometer, Physica UM (ball diameter 20 mm, ball angle 1°, ball tip-plate distance 0.05 mm, shear speed 10 to 1000 s$^{-1}$).

The mean particle size was measured by laser diffraction on a Sympatec device with the HELOS laser diffraction sensor.

The odor was evaluated qualitatively by smelling the mixed composition with the nose, grading an unpleasant, penetrating amine odor as "strong" and a weak or undetectable odor as "mild."

To determine the creep resistance, the composition was applied to an upright piece of cardboard using a wooden spatula, and the flow behavior was observed. The creep resistance was graded "good" if the composition had drifted slightly downward within one minute without flowing down and as "very good" if it did not move at all.

To measure the tack-free time (skin formation time), a small piece of the composition at room temperature was applied to a piece of cardboard in a layer thickness of about 3 mm and under standard climate conditions (23±1° C., 50±5% relative humidity) the time required until gently touching the surface of the composition with a LDPE pipette first failed to leave any residue on the pipette.

The tensile strength, the elongation at break and the modulus of elasticity were determined according to DIN EN 53504 (pulling speed: 200 mm/min) on dumbbells with a length of 75 mm, at a bar length of 30 mm and a bar width of 4 mm, produced by punching out from film with a thickness of about 3 mm of the composition hardened under the respectively reported conditions.

The Shore A hardness was determined according to DIN 53505 on test pieces hardened in a standard climate.

Production of N-(3-trimethoxysilyl-propyl)-amino succinic acid diethyl ester

To 179 g (1 mol) 3-aminopropyl-trimethoxysilane (Silquest® A-1110 from Momentive Performance Materials) under exclusion of moisture, 172 g (1 mol) of maleic acid diethyl ester are slowly dropped in under good agitation and then agitated for an additional 2 hours. A colorless liquid with a viscosity at 20° C. of 60 mPa·s was obtained.

Production of Silane-Functional Polymer P1

Under exclusion of moisture, 1000 g of the polyol Acclaim® 12200 (from Bayer; low mono) poly¬oxy¬propylenediol, OH number 11.0 mg KOH/g, water content approx. 0.02% by weight), 43.6 g Isophorone diisocyanate (Vestanat® IPDI from Degussa), 126.4 g diisodecyl phthalate (DIDP; Palatinol® Z, from BASF) and 0.12 g dibutyltin dilaurate were heated to 90° C. under continuous agitation and left at this temperature until the titrimetrically determined content of free Isocyanate groups had reached a value of 0.63% by weight. Then 62.3 g N-(3-trimethoxysilylpropyl)-amino succinic acid diethyl ester was mixed in and the mixture agitated at 90° C. until free isocyanate could no longer be detected by FT-IR spectroscopy The silane-functional polyurethane polymer was cooled to room temperature and stored under exclusion of moisture.

Preparation of Epoxy Resin Emulsions

Emulsion E1: 68.5 parts by weight bisphenol A liquid resin (Araldite® GY-250 von Huntsman) were mixed at 50° C. with 10 parts by weight reactive diluent (Araldite® DY-E from Huntsman) and 1.5 parts by weight emulsifier (Disponil® 23 from Cognis) and then continuously emulsified with 20 parts by weight of water over a stator-rotor mixer at a rotation speed of 22 m/s. The white emulsion obtained had a creamy consistency, a viscosity at 20° C. of about 1100 mPa·s, an epoxy group content of 4.08 mEq/g and a mean particle size of about 1.6 μm, with 90% of the particles smaller than 2.7 μm, and remained unchanged for more than one year at room temperature.

Emulsion E2: 68.5 parts by weight bisphenol A liquid resin (Araldite® GY-250 from Huntsman) and 10 parts by weight bisphenol F liquid resin (D.E.R.™ 354 from Dow Chemical) were mixed at 50° C. with 1.5 parts by weight emulsifier (Disponil® 23 from Cognis) and then emulsified continuously with 20 parts by weight water on a stator-rotor mixer at a rotation speed of 22 m/s. The white emulsion obtained was of a creamy consistency, had a viscosity at 20° C. of about 1500 mPa·s, an epoxy group content of 4.28 mEq/g, [and] a mean particle size of about 1.5 μm, with 90% of the particles smaller than 2.6 μm, and remained unchanged at room temperature for more than one year.

Preparation of Compositions

Examples 1 to 6 and Ref1

For each example according to Table 1, under standard climate conditions, the silane-functional polymer P1 was mixed with a hardener or accelerator for epoxy resins in the form of a Mannich base (Ancamine® K54=2,4,6-tris(dimethyl-aminomethyl)phenol, from Air Products), a catalyst (10% by weight dibutyltin dilaurate in diisodecyl phthalate) and an aminosilane (N-(2-aminoethyl)-3-aminopropyl-trimethoxysilane; Silquest® A-1120 from Momentive Performance Materials) and this composition as component A was mixed with emulsion E1 as component B in the indicated weight ratio using a dynamic mixer, applied immediately thereafter and hardened under standard climate conditions.

TABLE 1

Two-component compositions.
(Quantities in parts by weight)

| | Example | | | | | | |
|---|---|---|---|---|---|---|---|
| | Ref1 | 1 | 2 | 3 | 4 | 5 | 6 |
| component A: | | | | | | | |
| Polymer P1 | 92 | 92 | 92 | 92 | 92 | 92 | 92 |
| Ancamine ® K54 | 6 | 6 | 6 | 6 | 6 | 6 | 6 |
| Catalyst | 1 | 1 | 1 | 1 | 1 | 1 | 1 |
| Aminosilane | 1 | 1 | 1 | 1 | 1 | 1 | 1 |
| component B: | | | | | | | |
| Emulsion E1 | — | 10 | 20 | 40 | 60 | 80 | 100 |

After hardening, the compositions obtained in this way were tested for odor, stability, tack-free time and mechanical properties.

The results of these tests are presented in Table 2.

TABLE 2

Properties of the compositions.

| | Example | | | | | | |
|---|---|---|---|---|---|---|---|
| | Ref1 | 1 | 2 | 3 | 4 | 5 | 6 |
| Odor | strong | slight | slight | slight | slight | slight | slight |
| Stability | none | none | none | good | good | good | good |
| Tack-free time$^a$ (min.) | 65 | 55 | 50 | 42 | 47 | 52 | 50 |

TABLE 2-continued

Properties of the compositions.

| | Example | | | | | | |
|---|---|---|---|---|---|---|---|
| | Ref1 | 1 | 2 | 3 | 4 | 5 | 6 |
| Mechanical properties (21 days, standard climate): | | | | | | | |
| Tensile strength (MPa) | 0.4 | 1.2 | 3.4 | 2.9 | 3.0 | 2.3 | 2.1 |
| Elongation at break (%) | 50 | 180 | 290 | 260 | 260 | 250 | 230 |
| Modulus of elasticity (MPa)[b] | 0.9 | 1.4 | 1.8 | 1.6 | 3.5 | 4.0 | 4.9 |
| Mechanical properties (21 days standard climate + 2 days 80° C.): | | | | | | | |
| Tensile strength (MPa) | 0.3 | 0.8 | 2.3 | 4.5 | 6.1 | 6.7 | 6.6 |
| Elongation at break (%) | 40 | 140 | 220 | 230 | 220 | 210 | 150 |
| Modulus of elasticity (MPa)[b] | 0.8 | 1.0 | 1.6 | 2.2 | 7.2 | 11.5 | 19.6 |

[a]Time to disappearance of tackiness.
[b]at 0.5 to 50% elongation.

Examples 7 to 13

For each example, the silane-functional polymer P1 was mixed with a hardener or accelerator for epoxy resins in the form of a Mannich base (Ancamine® K54=2,4,6-tris(dimethylaminomethyl)phenol, from Air Products) or a polyamine (IPDA=Isophorone diamine), a catalyst (10% by weight dibutyltin dilaurate in diisodecyl phthalate) and an aminosilane (N-(2-aminoethyl)-3-aminopropyl-trimethoxysilane; Silquest® A-1120 from Momentive Performance Materials) according to Table 3 under standard climate conditions and this composition, as component A, was mixed with emulsion E2 as component B in the indicated weight ratio using a dynamic mixer, applied immediately thereafter and hardened under standard climate conditions.

TABLE 3

Two-component compositions.
(Quantities in parts by weight)

| | Example | | | | | | |
|---|---|---|---|---|---|---|---|
| | 7 | 8 | 9 | 10 | 11 | 12 | 13 |
| component A: | | | | | | | |
| Polymer P1 | 92 | 92 | 92 | 92 | 92 | 92 | 92 |
| Ancamine ® K54 | 6 | 6 | 0.5 | 6 | 6 | 6 | 6 |
| IPDA | — | — | 5.5 | — | — | — | — |
| Catalyst | 1 | 1 | 1 | 1 | 1 | 1 | 1 |
| Aminosilane | 1 | 1 | 1 | 1 | 1 | 1 | 1 |
| component B: | | | | | | | |
| Emulsion E2 | 10 | 20 | 30 | 40 | 60 | 80 | 100 |

After hardening, the compositions thus obtained were tested for odor, tack-free time and mechanical properties. In addition, the stability of the hardened composition was investigated under thermal and hydrolytic stress in that some of the dumbbells produced as described above were additionally held for one week in a kiln at 100° C. or at 70° C. and 100% relative humidity (cataplasm conditions) and then tested for tensile strength, elongation at break and modulus of elasticity.

The results of these tests are presented in Table 4.

TABLE 4

Properties of the compositions.

| | Example | | | | | | |
|---|---|---|---|---|---|---|---|
| | 7 | 8 | 9 | 10 | 11 | 12 | 13 |
| Odor | slight | slight | slight | slight | slight | slight | slight |
| Tack-free time[a] (min.) | 32 | 40 | 20 | 41 | 41 | 48 | 49 |
| Stability | none | none | none | none | good | good | good |
| Mechanical properties (21 days standard climate): | | | | | | | |
| Tensile strength (MPa) | 1.0 | 3.1 | 1.3 | 2.3 | 2.9 | 2.4 | 2.7 |
| Elongation at break (%) | 147 | 281 | 152 | 218 | 246 | 233 | 251 |
| Modulus of elasticity (MPa)[b] | 1.3 | 1.8 | 1.50 | 1.7 | 4.3 | 5.0 | 6.9 |
| Mechanical properties (21 days standard climate + 2 days 80° C.): | | | | | | | |
| Tensile strength (MPa) | 0.8 | 1.9 | 1.4 | 2.0 | 4.0 | 4.9 | 5.5 |
| Elongation at break (%) | 124 | 203 | 140 | 152 | 130 | 109 | 72 |
| Modulus of elasticity (MPa)[b] | 1.1 | 1.4 | 1.82 | 2.0 | 8.1 | 13.2 | 20.4 |
| Mechan. properties (21 days standard climate + 2 days 80° C. + 7 days 100° C.): | | | | | | | |
| Tensile strength (MPa) | 0.5 | 2.0 | n.d. | 1.8 | 4.2 | 5.3 | 5.8 |
| Elongation at break (%) | 86 | 201 | n.d. | 135 | 133 | 112 | 76 |
| Modulus of elasticity (MPa)[b] | 1.0 | 1.5 | n.d. | 2.0 | 7.4 | 12.8 | 20.5 |
| Mechan. properties (21 days standard climate + 2 days 80° C. + 7 days cataplasm): | | | | | | | |
| Tensile strength (MPa) | 0.6 | 1.8 | n.d. | 2.9 | 5.0 | 6.7 | 7.1 |
| Elongation at break (%) | 126 | 200 | n.d. | 176 | 182 | 152 | 98 |
| Modulus of elasticity (MPa)[b] | 0.8 | 1.4 | n.d. | 2.2 | 8.3 | 20.5 | 34.9 |

[a]Tack-free time.
[b]at 0.5 to 50% elongation.
n.d. = not determined

Examples 14 to 19 and Ref2

For each example according to Table 5 under standard climate a commercial STP-polymer (MS Polymer™ S 203 H from Kaneka) was mixed with a hardener or accelerator for epoxy resins in the form of a Mannich base (Ancamine® K54=2,4,6-Tris(dimethylaminomethyl)phenol from Air Products) or a polyamine (IPDA=Isophorone diamine), a catalyst (10% by weight dibutyltin dilaurate in diisodecyl phthalate) and an aminosilane (N-(2-aminoethyl)-3-aminopropyltrimethoxysilane; Silquest® A-1120 from Momentive Performance Materials) and this composition was mixed as component A with emulsion E1 as component B in the indicated weight ratio using a dynamic mixer, applied immediately thereafter and hardened under standard climate conditions.

TABLE 5

Two-component compositions.
(Quantities in parts by weight)

| | Example | | | | | | |
|---|---|---|---|---|---|---|---|
| | Ref2 | 14 | 15 | 16 | 17 | 18 | 19 |
| component A: | | | | | | | |
| MS polymer ™ S 203 H | 92 | 92 | 92 | 92 | 92 | 92 | 92 |
| Ancamine ® K54 | 6 | 6 | 6 | 6 | 1 | 1 | 6 |
| IPDA | — | — | — | — | 5 | 5 | — |
| Catalyst | 3 | 3 | 3 | 3 | 3 | 3 | 3 |
| Aminosilane | 1 | 1 | 1 | 1 | 1 | 1 | 1 |
| component B: | | | | | | | |
| Emulsion E1 | — | 10 | 20 | 30 | 30 | 50 | 60 |

The compositions thus obtained were tested for tack-free time and mechanical properties after hardening.

The results of these tests are shown in Table 6.

TABLE 6

Properties of the compositions.

| | Example | | | | | | |
|---|---|---|---|---|---|---|---|
| | Ref2 | 14 | 15 | 16 | 17 | 18 | 19 |
| Curing speed: | | | | | | | |
| Tack-free time$^a$ | >8 h | 8 h | 4-8 h | 4-8 h | 4 h | 4 h | 8 h |
| Mechanical properties (11 days standard climate): | | | | | | | |
| Tensile strength (MPa) | 0.2 | 0.8 | 1.5 | 1.6 | 1.8 | 1.9 | 1.8 |
| Elongation at break (%) | 190 | 360 | 370 | 390 | 450 | 470 | 570 |
| Modulus of elasticity (MPa)$^b$ | 0.13 | 0.19 | 0.22 | 0.20 | 0.19 | 0.26 | 0.12 |
| Mechanical properties (11 days standard climate + 2 days 80° C.): | | | | | | | |
| Tensile strength (MPa) | 0.3 | 0.4 | 1.7 | 3.5 | 2.2 | 1.8 | 2.8 |
| Elongation at break (%) | 200 | 350 | 390 | 590 | 480 | 530 | 690 |
| Modulus of elasticity (MPa)$^b$ | 0.17 | 0.21 | 0.21 | 0.23 | 0.35 | 0.40 | 0.45 |

$^a$Tack-free time.
$^b$at 0.5 to 50% elongation.

Examples 20 to 22 and Ref3 to Ref6

For each example according to Table 7 under standard climate conditions, component A of the commercial mounting adhesive Sikaflex®-553, based on a silane-endcapped polymer (available from von Sika Schweiz AG) was mixed with a hardener or accelerator for epoxy resins in the form of a Mannich base (Ancamine® K54=2,4,6-tris(dimethylaminomethyl)phenol, from Air Products) and optionally a catalyst (DBU=1,8-diazabicyclo[5.4.0]undec-7-ene or TMG=1,1,3,3,-Tetramethylguanidine) and this composition was mixed as component A with the emulsion E2 as component B in the indicated weight ratio using a dynamic mixer, applied immediately thereafter and hardened under standard climate conditions.

TABLE 7

Two-component compositions.
(Quantities in parts by weight)

| | Example | | | | | | |
|---|---|---|---|---|---|---|---|
| | Ref3 | Ref4 | Ref5 | Ref6 | 20 | 21 | 22 |
| component A: | | | | | | | |
| Sikaflex ®-553 Comp. A | 100 | 99.8 | 90.9 | 90.7 | 87.4 | 87.4 | 87.4 |
| Ancamine ® K54 | — | — | — | — | 3.3 | 3.3 | 3.3 |
| DBU | — | 0.2 | — | 0.2 | — | 0.2 | — |
| TMG | — | — | — | — | — | — | 0.2 |
| component B: | | | | | | | |
| Emulsion E2 | — | — | 9.1 | 9.1 | 9.1 | 9.1 | 9.1 |

The compositions thus obtained were tested for stability, tack-free time and mechanical properties after 7 days (tensile strength, elongation at break, modulus of elasticity) or 14 days (Shore A) of hardening under standard climate conditions.

The results of these tests are presented in Table 8.

TABLE 8

Properties of the compositions.

| | Example | | | | | | |
|---|---|---|---|---|---|---|---|
| | Ref3 | Ref4 | Ref5 | Ref6 | 20 | 21 | 22 |
| Stability | good | good | very good | very good | very good | very good | very good |
| Tack-free time$^a$ (min.) | 40 | 22 | 33 | 18 | 72 | 22 | 40 |
| Tensile strength (MPa) | 2.4 | 2.3 | 2.7 | 2.8 | 4.2 | 4.6 | 4.7 |
| Elongation at break (%) | 210 | 240 | 420 | 440 | 300 | 240 | 240 |

TABLE 8-continued

Properties of the compositions.

| | Example | | | | | | |
|---|---|---|---|---|---|---|---|
| | Ref3 | Ref4 | Ref5 | Ref6 | 20 | 21 | 22 |
| Modulus of elasticity[b] (MPa) | 2.8 | 2.8 | 1.6 | 2.2 | 7.0 | 6.6 | 7.0 |
| Shore A | 51 | 46 | 41 | 42 | 70 | 67 | 67 |

[a]Tack-free time.
[b]at 0.5 to 5% elongation.

Examples 23 to 28

For each example according to Table 9 under standard climate, component A of the commercial mounting adhesive Sikaflex®-553, based on silane-endcapped (available from Sika Schweiz AG) was mixed with a hardener or accelerator for epoxy resins in the form of a tertiary amine (Jeffcat® Z-130=N,N-dimethyl-N'-(dimethylaminopropyl)-1,3-propanediamine, from Huntsman; DMP=N,N'-dimethylpiperazine; Jeffcat® ZF-20=bis(2-dimethylaminoethyl)ether, from Huntsman) or an imidazole and a catalyst (DBU=1,8-diazabicyclo[5.4.0]undec-7-ene) and this composition was mixed as component A with emulsion E2 as component B in the indicated weight ratio using a dynamic mixer, applied immediately thereafter and hardened under standard climate conditions.

TABLE 9

Two-component compositions.
(Quantities in parts by weight)

| | Example | | | | | |
|---|---|---|---|---|---|---|
| | 23 | 24 | 25 | 26 | 27 | 28 |
| component A: | | | | | | |
| Sikaflex ®-553 Comp. A | 88.4 | 88.6 | 87.7 | 89.2 | 89.0 | 88.7 |
| Jeffcat ® Z-130 | 2.3 | — | — | — | — | — |
| DMP | — | 2.1 | — | — | — | — |
| Jeffcat ® ZF-20 | — | — | 3.0 | — | — | — |
| 1-Methylimidazole | — | — | — | 1.5 | — | — |
| 1-Vinylimidazole | — | — | — | — | 1.7 | — |
| 2-Ethyl-4-methylimidazole | — | — | — | — | — | 2.0 |
| DBU | 0.2 | 0.2 | 0.2 | 0.2 | 0.2 | 0.2 |
| component B: | | | | | | |
| Emulsion E2 | 9.1 | 9.1 | 9.1 | 9.1 | 9.1 | 9.1 |

The compositions thus obtained were tested for stability, tack-free time and mechanical properties after 7 days (tensile strength, elongation at break, modulus of elasticity) or 14 days (Shore A) of hardening under standard climate conditions.

The results of these tests are presented in Table 10.

TABLE 10

Properties der compositions.

| | Example | | | | | |
|---|---|---|---|---|---|---|
| | 23 | 24 | 25 | 26 | 27 | 28 |
| Stability | very good | very good | very good | very good | very good | very good |
| Tack-free time[a] (min.) | 8 | 14 | 13 | 8 | 7 | 25 |
| Tensile strength (MPa) | 3.8 | 3.8 | 3.8 | 3.6 | 3.5 | 3.9 |

TABLE 10-continued

Properties der compositions.

| | Example | | | | | |
|---|---|---|---|---|---|---|
| | 23 | 24 | 25 | 26 | 27 | 28 |
| Elongation at break (%) | 120 | 240 | 180 | 290 | 280 | 230 |
| Modulus of elasticity[b] (MPa) | 8.7 | 7.3 | 6.2 | 6.2 | 5.5 | 7.8 |
| Shore A | 70 | 56 | 70 | 56 | 52 | 60 |

[a]Tack-free time.
[b]at 0.5 to 5% elongation.

Examples 29 and Ref7

For each example according to Table 11 under standard climate conditions component A of the commercial mounting adhesive Korapop 225, based on silane-endcapped polymer (available from Kömmerling Chemische Fabrik GmbH, Germany) was mixed with a hardener or accelerator for epoxy resins in the form of a Mannich base (Ancamine® K54=2,4,6-tris(dimethylaminomethyl)phenol, from Air Products) and a (DBU=1,8-diazabicyclo[5.4.0]undec-7-ene) and this composition was mixed as component A with the emulsion E2 as component B in the indicated weight ratio using a dynamic mixer, applied immediately thereafter, and hardened under standard climate conditions.

TABLE 11

Two-component compositions.
(Quantities in parts by weight)

| | Example | |
|---|---|---|
| | Ref7 | 29 |
| component A: | | |
| Körapop 225 Comp. A | 100 | 87.4 |
| Ancamine® K54 | — | 3.3 |
| DBU | — | 0.2 |
| component B: | | |
| emulsion E2 | — | 9.1 |

The compositions thus obtained were tested for stability, tack-free time and mechanical properties after 7 days (tensile strength, elongation at break, modulus of elasticity) or 14 days (Shore A) of hardening under standard climate conditions.

The results of these tests are listed in Table 12.

TABLE 12

Properties der compositions.

| | Example | |
|---|---|---|
| | Ref7 | 29 |
| Stability | good | very good |
| Tack-free time[a] (min.) | 27 | 23 |
| Tensile strength (MPa) | 2.6 | 3.0 |
| Elongation at break (%) | 420 | 180 |
| Modulus of elasticity[b] (MPa) | 1.5 | 22.7 |
| Shore A | 40 | 72 |

[a]Tack-free time.
[b]at 0.5 to 5% elongation.

The invention claimed is:

1. A method of adhesive bonding, sealing, or coating a substrate, comprising:
   mixing a component A and a component B of a two-component composition together to obtain a hardenable composition;
   applying the hardenable composition to the substrate; and
   hardening the hardenable composition applied to the substrate, wherein:
   component A, at the time of mixing, comprises at least one silane-functional polymer, and at least one hardener or accelerator for epoxy resins;
   component B, at the time of mixing, comprises at least one aqueous emulsion including epoxy resin particles and an emulsifier formed by emulsifying at least one liquid epoxy resin in the presence of the emulsifier and water;
   the silane-functional polymer includes (i) a silane-functional polyurethane polymer obtainable by reacting a silane that includes at least one group reactive toward isocyanate groups and a polyurethane polymer that includes isocyanate groups, or (ii) a silane-functional polyurethane polymer obtainable by reacting an isocyanatosilane and a polymer that includes functional end groups reactive toward isocyanate groups; and
   the epoxy resin particles have a mean particle size in the range of 0.05 to 10 μm.

2. The method according to claim 1, wherein the aqueous emulsion contains 10 to 40% by weight of water.

3. The method according to claim 1, wherein the emulsion has a particle size distribution, in which the size ratio of the largest to the smallest particles has a value in the range of ≤25.

4. The method according to claim 1, wherein 90% of the particles in the emulsion are smaller than 6 μm.

5. The method according to claim 1, wherein the hardener or accelerator for epoxy resins is selected from the group consisting of tertiary polyamines, Mannich bases, polymercaptans and imidazoles.

6. The method according to claim 1, wherein the hardener or accelerator for epoxy resins is selected from the group consisting of pentamethyl-diethylenetriamine, N,N-dimethyl-N'-(dimethylamino-propyl)-1,3-propanediamine, bis(2-dimethylaminoethyl)ether, bis-(-dimethyl-aminoethyl)-piperazine, N,N'-dimethylpiperazine, dimethylaminomethyl-phenol, 2,4,6-tris(dimethyl-aminomethyl)-phenol, 2,4,6-tris((3-(dimethylamino)propyl)-aminomethyl)phenol, 1-methylimidazole, 1-ethylimidazole, 1-vinylimidazole, 2-methylimidazole, 2-ethylimidazole, 2-isopropylimidazole, 2-heptadecylimidazole, 2-ethyl-4-methylimidazole and 1-benzyl-2-methylimidazole.

7. The method according to claim 1, wherein the two-component composition further comprises at least one catalyst for cross-linking the silane-functional polymer with the aid of moisture.

8. The method according to claim 7, wherein the catalyst for cross-linking the silane-functional polymer using moisture is selected from the group consisting of organotin compounds, titanates, zirconates, tertiary amines, amidines and guanidines.

9. The method according to claim 1, wherein the two-component composition further comprises at least one aminosilane, an epoxysilane or a mercaptosilane.

10. The method according to claim 1, wherein the two-component composition further comprises at least one filler.

11. The method according to claim 1, wherein the fraction of the hardener or accelerator for epoxy resins is 0.5 to 15% by weight based on component A.

12. The method according to claim 1, wherein the weight ratio of component A to component B is 1:1 to 100:1.

13. The method according to claim 1, wherein hardening the hardenable composition results in a partially hardened composition.

14. The method according to claim 1, wherein hardening the hardenable composition results in a completely hardened composition.

15. The method according to claim 1, wherein the silane-functional polymer is the polymer of (i), in which the silane is a mercaptosilane or an aminosilane.

16. The method according to claim 1, wherein the weight ratio of component A to component B is 2.5:1 to 100:1.

17. The method according to claim 1, wherein component A is in a non-aqueous system at the time of coming into contact with component B.

18. The method according to claim 1, wherein the aqueous emulsion has a solids content of 70 to 90% by weight.

19. A method of adhesive bonding, sealing, or coating a substrate, comprising:
   mixing a component A and a component B of a two-component composition together to obtain a hardenable composition;
   applying the hardenable composition to the substrate; and
   hardening the hardenable composition applied to the substrate, wherein:
   component A, at the time of mixing, comprises at least one silane-functional polymer, and at least one hardener or accelerator for epoxy resins;
   component B, at the time of mixing, comprises at least one aqueous emulsion including epoxy resin particles and an emulsifier formed by emulsifying at least one liquid epoxy resin in the presence of the emulsifier and water;
   component A is in a non-aqueous system prior to coming into contact with component B; and
   the epoxy resin particles have a mean particle size in the range of 0.05 to 10 μm.

20. The method according to claim 19, wherein
   the silane-functional polymer includes (i) a silane-functional polyurethane polymer obtainable by reacting a silane that includes at least one group reactive toward isocyanate groups and a polyurethane polymer that includes isocyanate groups, (ii) a silane-functional polyurethane polymer obtainable by reacting an isocyanatosilane and a polymer that includes functional end groups reactive toward isocyanate groups, or (iii) a silane-functional polymer obtainable by a hydroxysilylation reaction of polymers with terminal double bonds.

21. The method according to claim 19, wherein the aqueous emulsion has a solids content of 70 to 90% by weight.

* * * * *